US009060277B2

(12) United States Patent
Yang

(10) Patent No.: US 9,060,277 B2
(45) Date of Patent: Jun. 16, 2015

(54) MOBILE COMMUNICATION DEVICES, WIRELESS ACCESS POINTS, AND WIRELESS LOCAL AREA NETWORK (WLAN) AUTHENTICATION METHODS THEREOF

(71) Applicant: Quanta Computer Inc., Kuei Shan Hsiang, Tao Yuan Shien (TW)

(72) Inventor: Bor-Wen Yang, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 14/023,777

(22) Filed: Sep. 11, 2013

(65) Prior Publication Data

US 2014/0181515 A1 Jun. 26, 2014

(30) Foreign Application Priority Data

Dec. 25, 2012 (TW) .............................. 101149686 A

(51) Int. Cl.
| | | |
|---|---|---|
| H04W 12/06 | (2009.01) |
| H04L 9/32 | (2006.01) |
| H04W 12/04 | (2009.01) |
| H04W 84/12 | (2009.01) |
| H04W 88/10 | (2009.01) |

(52) U.S. Cl.
CPC ............. *H04W 12/06* (2013.01); *H04W 12/04* (2013.01); *H04W 84/12* (2013.01); *H04W 88/10* (2013.01); *H04L 9/3271* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 7,539,866 B2* | 5/2009 | Kang et al. ................... 713/171 |
| 7,669,230 B2* | 2/2010 | Chaplin ............................. 726/2 |
| 7,721,325 B2* | 5/2010 | Lee et al. .......................... 726/4 |
| 7,903,817 B2 | 3/2011 | Cam-Winget et al. |
| 8,280,349 B2* | 10/2012 | Ishikawa et al. .............. 455/410 |
| 2010/0166186 A1* | 7/2010 | Shiba ............................ 380/278 |

FOREIGN PATENT DOCUMENTS

| | | |
|---|---|---|
| TW | I326995 | 7/2010 |
| WO | WO 2010/124739 | 11/2010 |

OTHER PUBLICATIONS

Taiwanese language office action dated Sep. 25, 2014.
English language translation of abstract of TW 1326995 (published Jul. 1, 2010).

* cited by examiner

*Primary Examiner* — Minh Dinh
(74) *Attorney, Agent, or Firm* — McClure, Qualey & Rodack, LLP

(57) ABSTRACT

A Wireless Access Point (WAP) including a Local Area Network (LAN) interface and a first wireless module is provided. The LAN interface is configured to provide access to the Internet. The first wireless module is configured to generate a plurality of security parameters associated with a Wireless Local Area Network (WLAN) technology, use the WLAN technology to perform an authentication procedure with a mobile communication device according to the security parameters, and after completing the authentication procedure, provide a Hotspot service of the WLAN technology to the mobile communication device via the LAN interface, wherein the security parameters are transmitted, prior to the authentication procedure, to the mobile communication device via an encrypted connection which is established using a cellular network technology.

11 Claims, 6 Drawing Sheets

MOBILE COMMUNICATION DEVICES, WIRELESS ACCESS POINTS, AND WIRELESS LOCAL AREA NETWORK (WLAN) AUTHENTICATION METHODS THEREOF

CROSS REFERENCE TO RELATED APPLICATIONS

This Application claims priority of Taiwan Patent Application No. 101149686, filed on Dec. 25, 2012, the entirety of which is incorporated by reference herein.

BACKGROUND OF THE INVENTION

1. Field of the Invention

The invention generally relates to Wireless Local Area Network (WLAN) authentication, and more particularly, to communication systems for integrating WLAN technology and cellular network technology, and WLAN authentication methods thereof.

2. Description of the Related Art

With rapid developments in ubiquitous computing and networking, various wireless technologies have been developed, such as the WLAN technologies, including Wireless Fidelity (WiFi) technology, and Bluetooth technology, etc., and the cellular network technologies (or called Wireless Wide Area Network (W-WAN) technologies), including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, and Time-Division LTE (TD-LTE) technology, etc.

Due to the fact that different wireless technologies have different characteristics, such as bandwidths, average coverage, service rates, and costs, etc., having a plurality of wireless modules integrated in a single communication device has become a popular choice for providing convenience and flexibility for users. However, integrated wireless modules generally operate independently. For example, a general mobile phone may support the WiFi technology and at least one cellular network technology, and more and more Wireless Access Points (WAPs) are capable of simultaneously providing the Hotspot service of the WLAN technology and the femto-cell function of at least one cellular network technology. Specifically, the communication protocol of the WiFi technology specifies operations, such as association, authentication, and transmission/reception, etc., and the communication protocol of the at least one cellular network technology specifies operations, such as connection establishment, and transmission/reception, etc., wherein the operations associated with the WiFi technology and the cellular network technology are performed independently. Thus, it is desirable to have a more flexible and efficient way of authentication for such integrated communication systems.

BRIEF SUMMARY OF THE INVENTION

In one aspect of the invention, a mobile communication device is provided. The mobile communication device comprises a first wireless module and a second wireless module. The first wireless module is configured to communicate with an integrated WAP using a cellular network technology, wherein the communications comprise establishing an encrypted connection to the integrated WAP, and receiving a plurality of security parameters associated with a WLAN technology from the integrated WAP via the encrypted connection. The second wireless module is configured to communicate with the integrated WAP or a partner WAP connected to the integrated WAP using the WLAN technology, wherein the communications comprise performing an authentication procedure with the integrated WAP or the partner WAP according to the security parameters.

In another aspect of the invention, a Wireless Access Point comprising a Local Area Network (LAN) interface and a first wireless module is provided. The LAN interface is configured to provide access to the Internet. The first wireless module is configured to generate a plurality of security parameters associated with a WLAN technology, use the WLAN technology to perform an authentication procedure with a mobile communication device according to the security parameters, and after completing the authentication procedure, provide a Hotspot service of the WLAN technology to the mobile communication device via the LAN interface, wherein the security parameters are transmitted, prior to the authentication procedure, to the mobile communication device via an encrypted connection which is established using a cellular network technology.

In yet another aspect of the invention, a WLAN authentication method is provided. The WLAN authentication method comprises the steps of: providing a mobile communication device and a WAP, wherein the WAP supports a WLAN technology and the mobile communication device supports the WLAN technology and a cellular network technology; generating, by the WAP, a plurality of security parameters associated with the WLAN technology; receiving, by the mobile communication device, the security parameters via an encrypted connection which is established using the cellular network technology; and performing an authentication procedure between the mobile communication device and the WAP using the WLAN technology according to the security parameters.

Other aspects and features of the invention will become apparent to those with ordinary skill in the art upon review of the following descriptions of specific embodiments of the mobile communication devices, WAPs, and WLAN authentication methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
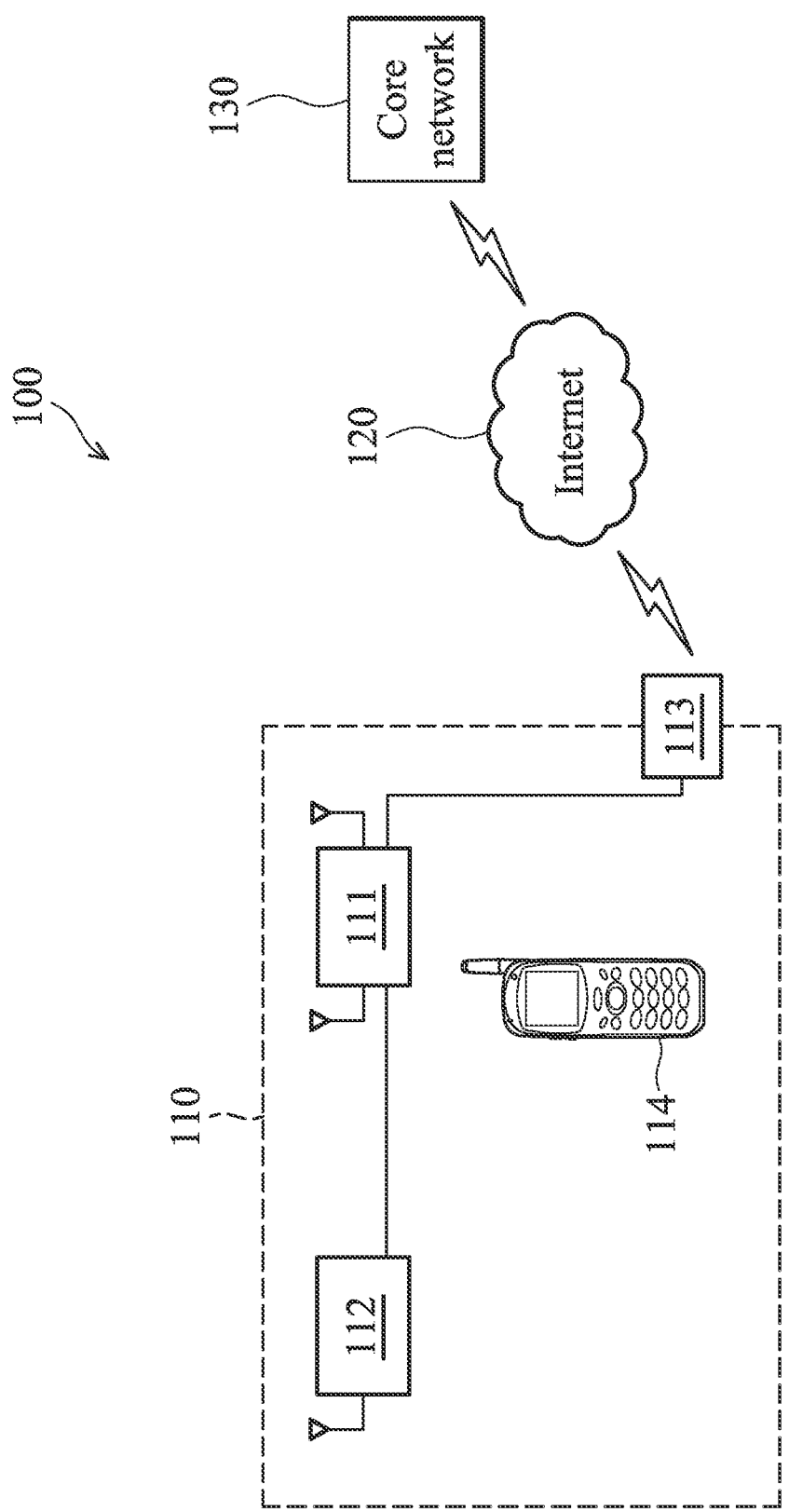
FIG. 1 is a block diagram illustrating a wireless communication environment according to an embodiment of the invention.

FIG. 1 is a block diagram illustrating a wireless communication environment according to an embodiment of the invention. In the wireless communication environment 100, two WAPs 111 and 112 are disposed in an area 110, e.g., home, office, museum, or amusement park, etc., wherein the WAP 112 is connected to the WAP 111 via a LAN interface, e.g., an Ethernet interface, and the WAP 111 is connected to a network access device 113, e.g., a gateway or modem, for providing access to the Internet 120 and the core network 130 of a telecom system. In another embodiment, the WAP 111 and the network access device 113 may be integrated in a single device to simplify the system architecture thereof.

In one embodiment, the telecom system may be a WCDMA network, and the core network 130 may be a GPRS core which includes a Home Location Register (HLR), at least a Serving GPRS Support Node (SGSN), and at least a Gateway GPRS Support Node (GGSN). In another embodiment, the telecom system may be an LTE network, and the core network 130 may be an Evolved Packet Core (EPC) which includes a Home Subscriber Server (HSS), a Mobility Management Entity (MME), a Serving Gateway (S-GW), and a Packet Data Network Gateway (PDN-GW/P-GW).

The WAP 111 may be an integrated WAP which provides the Hotspot service of the WLAN technology and the femto-cell function of the same cellular network technology utilized by the core network 130, while the WAP 112 may be a partner WAP which only provides the Hotspot service of the WLAN technology. A mobile communication device 114 of a user is also in the area 110, which supports both the WLAN technology and the same cellular network technology utilized by the core network 130. The mobile communication device 114 may communicate with the WAP 111 or 112 using the WLAN technology, and/or communicate with the WAP 111 using the cellular network technology, to obtain wireless services for the user. Particularly, the WAPs 111 and 112 are configured with the same Service Set Identifier (SSID) and the same security parameters for the Hotspot service of the WLAN technology, so that the mobile communication device 114 may use a single set of configurations to communicate with the WAP 111 or 112. Due to the same SSID being shared by the WAPs 111 and 112, the mobile communication device 114 may obtain the Hotspot service of the WLAN technology from any one of the WAPs 111 and 112 as long as it has successfully performed an authentication procedure with either the WAP 111 or 112.

In another embodiment, more than one partner WAP may be disposed in the area 110 to expand the coverage of the Hotspot service, in a case for a wide area 110. Note that, although the mobile communication device 114 is depicted as a feature phone in FIG. 1, it may be a smart phone, panel PC, Notebook PC, or any computing device capable of wireless communications.

Figure 2:
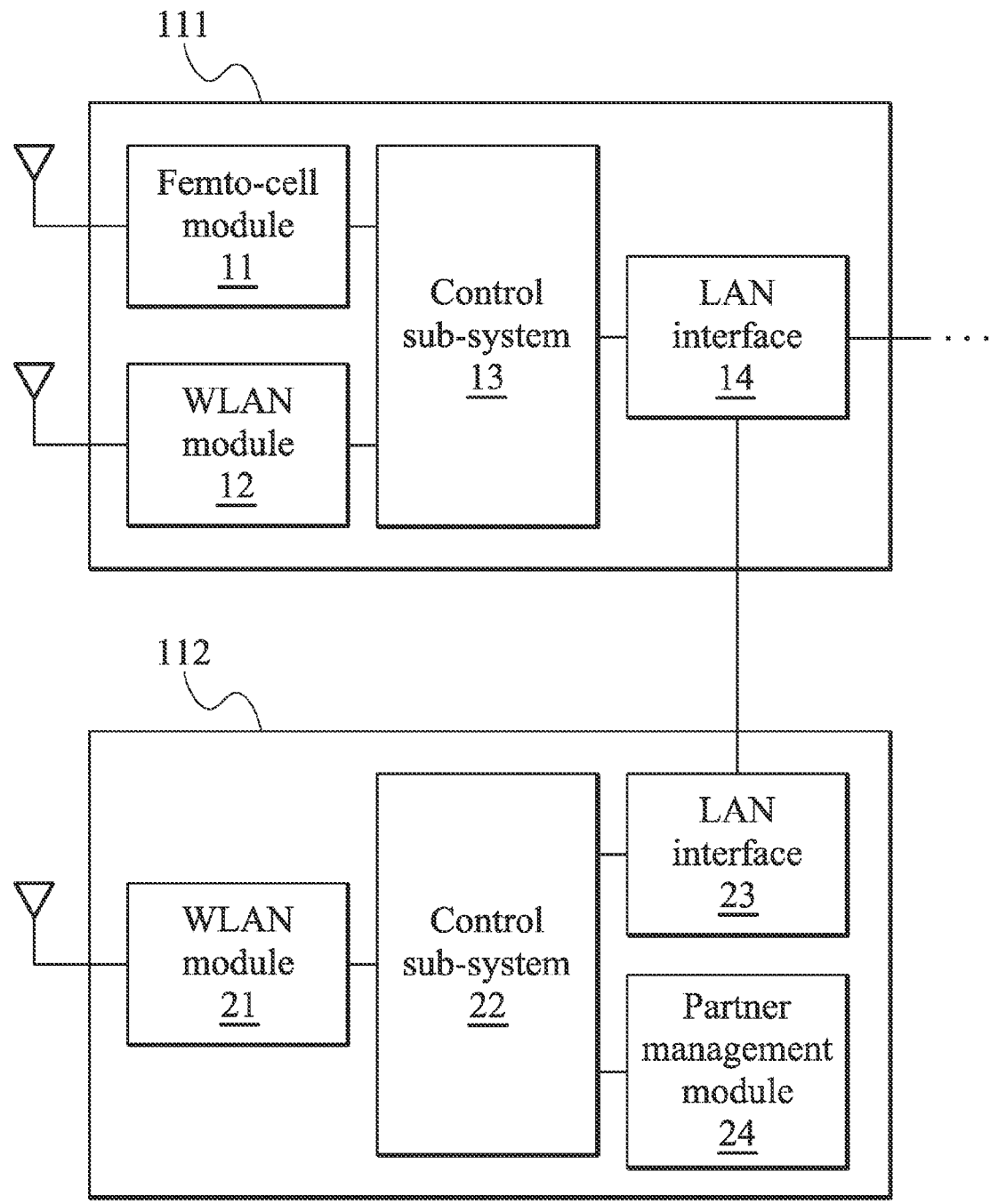
FIG. 2 is a block diagram illustrating the system architectures of the WAPs 111 and 112 according to an embodiment of the invention.

FIG. 2 is a block diagram illustrating the system architectures of the WAPs 111 and 112 according to an embodiment of the invention. The WAP 111 includes a femto-cell module 11, a WLAN module 12, a control sub-system 13, and a LAN interface 14, wherein the control sub-system 13 is coupled to the femto-cell module 11, the WLAN module 12, and the LAN interface 14. The femto-cell module 11 may be implemented in software, firmware, hardware, or any combination thereof, for providing the femto-cell function of a cellular network technology, such as the GSM, GPRS, EDGE, WCDAM, CDMA-2000, TD-SCDMA, WiMAX, LTE, or TD-LTE technology, etc.

The WLAN module 12 may be implemented in software, firmware, hardware, or any combination thereof, for providing the Hotspot service using a WLAN technology, such as the WiFi technology which is in compliance with the 802.11a, 802.11b, 802.11g, 802.11n, 802.11ac, or 802.11ad specification, the Bluetooth technology which is in compliance with the 802.15.1 specifications, or the ZigBee technology, etc.

The control sub-system 13 may include one or more Micro Control Units (MCUs), Digital Signal Processors (DSPs), memory (including volatile and/or non-volatile memory), and appropriate Input/Output (I/O) device(s). The control sub-system 13 is responsible for switching packets between the front-end modules (i.e., the femto-cell module 11 and the WLAN module 12) and the back-end module (i.e., the LAN interface 14).

The LAN interface 14 may be implemented in software, firmware, hardware, or any combination thereof, for connecting the WAP 111 to the WAP 112, and connecting the WAP 111 to the LAN (e.g., the network access device 113) to access the Internet 120. In another embodiment, the LAN interface 14 may be used only for connecting the WAP 111 to the WAP 112, and the WAP 111 may further include a WAN interface (not shown) for providing access to the Internet 120, wherein the WAN interface may be an interface conforming to the Ethernet, Cable modem, HomePlug or Phoneline Networking Alliance (HomePlug/HomePNA), Gigabit or Ethernet Passive Optical Networking (G-PON/E-PON), or Asymmetric or High-bit-rate or Very-High-Bit-rate Digital Subscriber Line (ADSL/HDSL/VDSL), etc.

The WAP 112 includes a WLAN module 21, a control sub-system 22, a LAN interface 23, and a partner management module 24, wherein the control sub-system 22 is coupled to the WLAN module 21, the LAN interface 23, and the partner management module 24. The detailed description of the WLAN module 21, the control sub-system 22, and the LAN interface 23 is similar to that of the WLAN module 12, the control sub-system 13, and the LAN interface 14 as mentioned above, and is omitted herein for brevity.

The partner management module 24 may be implemented in software, firmware, hardware, or any combination thereof, for statically establishing the partner relationship between the WAPs 111 and 112, or dynamically establishing the partner relationship therebetween using the Discovery protocol, and for forwarding packets between the WAP 111 and the WLAN module 21 via the LAN interface 23. It is noted that, once the partner relationship between the WAPs 111 and 112 is established, the WAP 111 may operate the WAP 112 as if the WAP 112 is another WLAN module like the WLAN module 12. That is, the WLAN modules 12 and 21 are configured with the same SSID and the same security parameters for the Hotspot service of the WLAN technology, so that the mobile communication device 114 may use a single set of configurations to communicate with the WAP 111 or 112.

In another embodiment, the WAP 111 may not include the WLAN module 12, and may provide the Hotspot service of the WLAN technology via the WAP 112 after establishing the partner relationship with the WAP 112.

Figure 3:
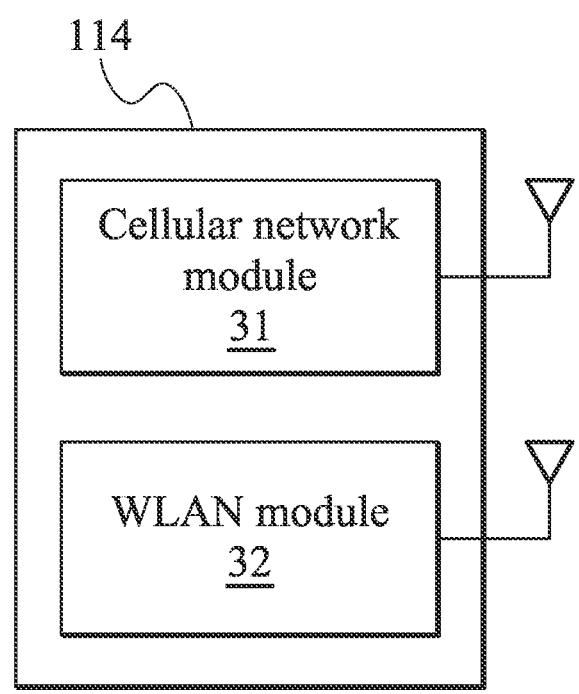
FIG. 3 is a block diagram illustrating the system architecture of the mobile communication device 114 according to an embodiment of the invention.

FIG. 3 is a block diagram illustrating the system architecture of the mobile communication device 114 according to an embodiment of the invention. The mobile communication device 114 includes a cellular network module 31 and a WLAN module 32, wherein the cellular network module 31 may be implemented in software, firmware, hardware, or any combination thereof, for providing the femto-cell function using a cellular network technology. Particularly, the cellular network module 31 and the femto-cell module 11 use the same cellular network technology for wireless communications. The WLAN module 32 may be implemented in software, firmware, hardware, or any combination thereof, for providing the Hotspot service using a WLAN technology. Particularly, the WLAN module 32 and the WLAN module 12 or 21 use the same WLAN technology for wireless communications.

For example, the cellular network module 31 and the WLAN module 32 may each include a baseband unit (not shown) and a Radio Frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted.

Figure 4:
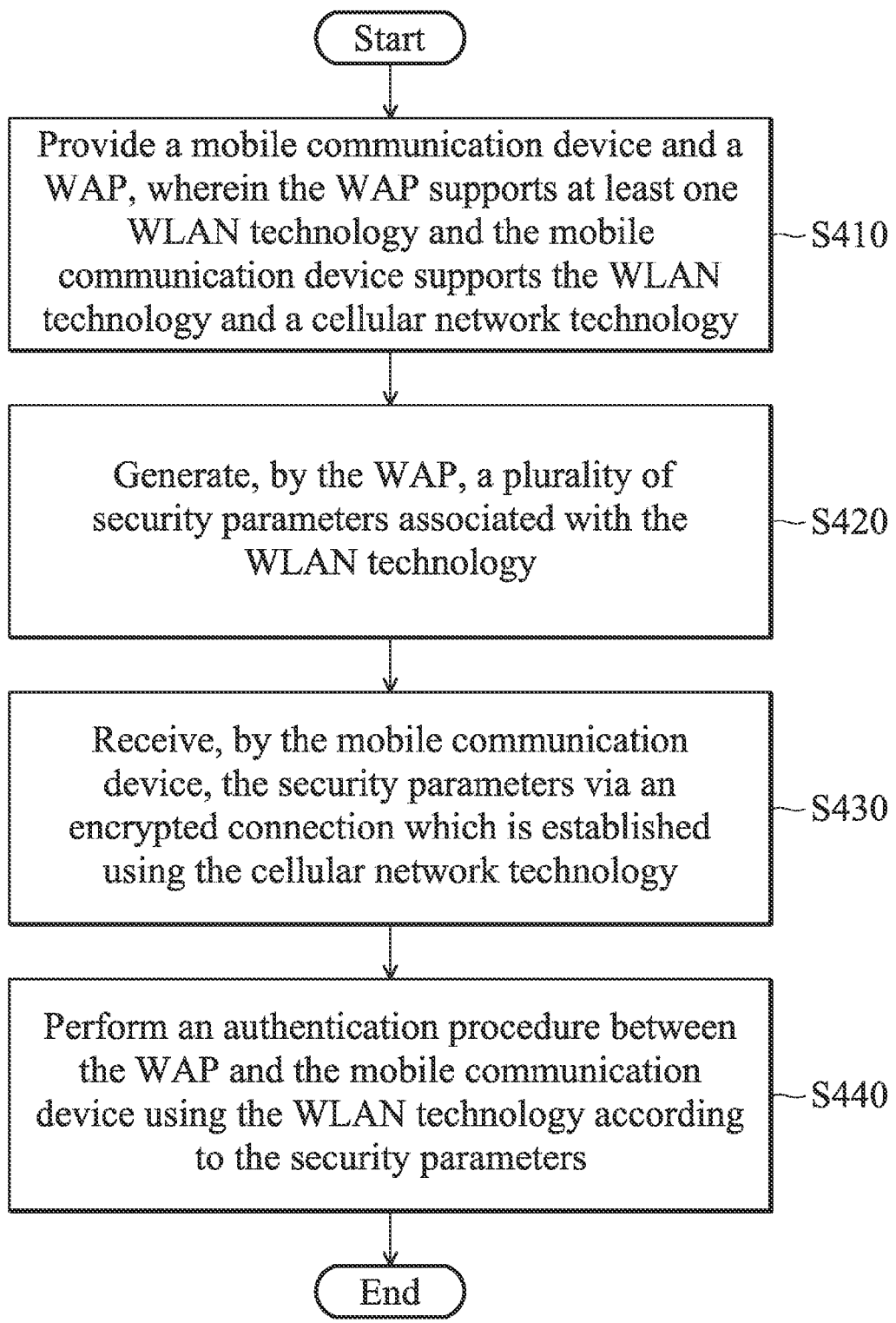
FIG. 4 is a flow chart illustrating the WLAN authentication method according to an embodiment of the invention.

FIG. 4 is a flow chart illustrating the WLAN authentication method according to an embodiment of the invention. To begin, a mobile communication device and a WAP are provided, wherein the WAP supports at least one cellular network technology and the mobile communication device supports the WLAN technology and a cellular network technology (step S410). The WAP may be an integrated WAP, such as the WAP 111, or may be a partner WAP, such as the WAP 112. Next, the WAP generates a plurality of security parameters associated with the WLAN technology (step S420). Subsequently, the mobile communication device receives the security parameters via an encrypted connection which is established using the cellular network technology (step S430). The establishment of the encrypted connection may be performed by the WAP if the WAP is an integrated WAP which also supports the same cellular network technology utilized by the mobile communication device, or if the WAP is a partner WAP, the WAP may be connected to an integrated WAP, which also supports the same cellular network technology utilized by the mobile communication device, via a LAN interface and then forward the security parameters to the integrated WAP to be transmitted to the mobile communication device via the encrypted connection established by the integrated WAP. After that, an authentication procedure between the WAP and the mobile communication device is performed using the WLAN technology according to the security parameters (step S440).

Figure 5:
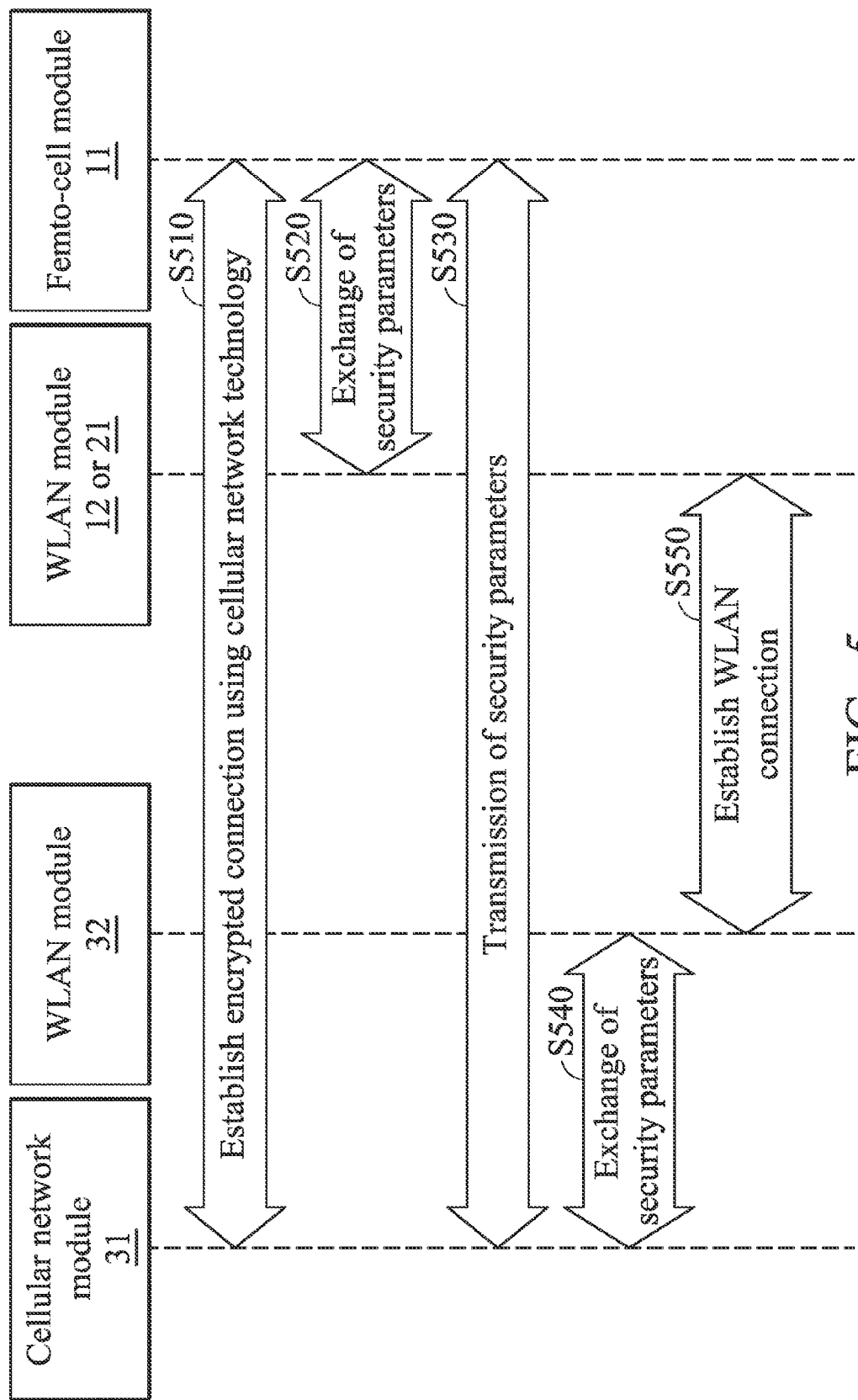
FIG. 5 is a message sequence chart illustrating the communications between the mobile communication device 114 and the WAPs 111 and 112 according to an embodiment of the invention.

FIG. 5 is a message sequence chart illustrating the communications between the mobile communication device 114 and the WAPs 111 and 112 according to an embodiment of the invention. To begin, the cellular network module 31 of the mobile communication device 114 and the femto-cell module 11 of the WAP 111 establish an encrypted connection therebetween using the cellular network technology which is supported by both of the cellular network module 31 and the femto-cell module 11 (step S510). Detailed description regarding the establishment of the encrypted connection is omitted herein, since it is beyond the scope of the invention, and reference may be made to the specifications of the cellular network technology in use. Next, the security parameters, such as SSID, encryption algorithm, encryption password, and encryption ticket, etc., which are required by the WLAN module 21 of the WAP 112 or the WLAN module 12 of the WAP 111, are forwarded or exchanged to the femto-cell module 11 of the WAP 111 (step S520), and also transmitted to the cellular network module 31 of the mobile communication device 114 by the femto-cell module 11 of the WAP 111 (step S530). Subsequently, the security parameters are forwarded or exchanged to the WLAN module 32 of the mobile communication device 114 (step S540). After receiving the security parameters, the WLAN module 32 of the mobile communication device 114 establishes a WLAN connection with the WLAN module 12 of the WAP 111 or the WLAN module 21 of the WAP 112 (step S550). The establishment of the WLAN connection may include an association procedure and an authentication procedure, and further description of the association and authentication procedures is given below.

Figure 6:
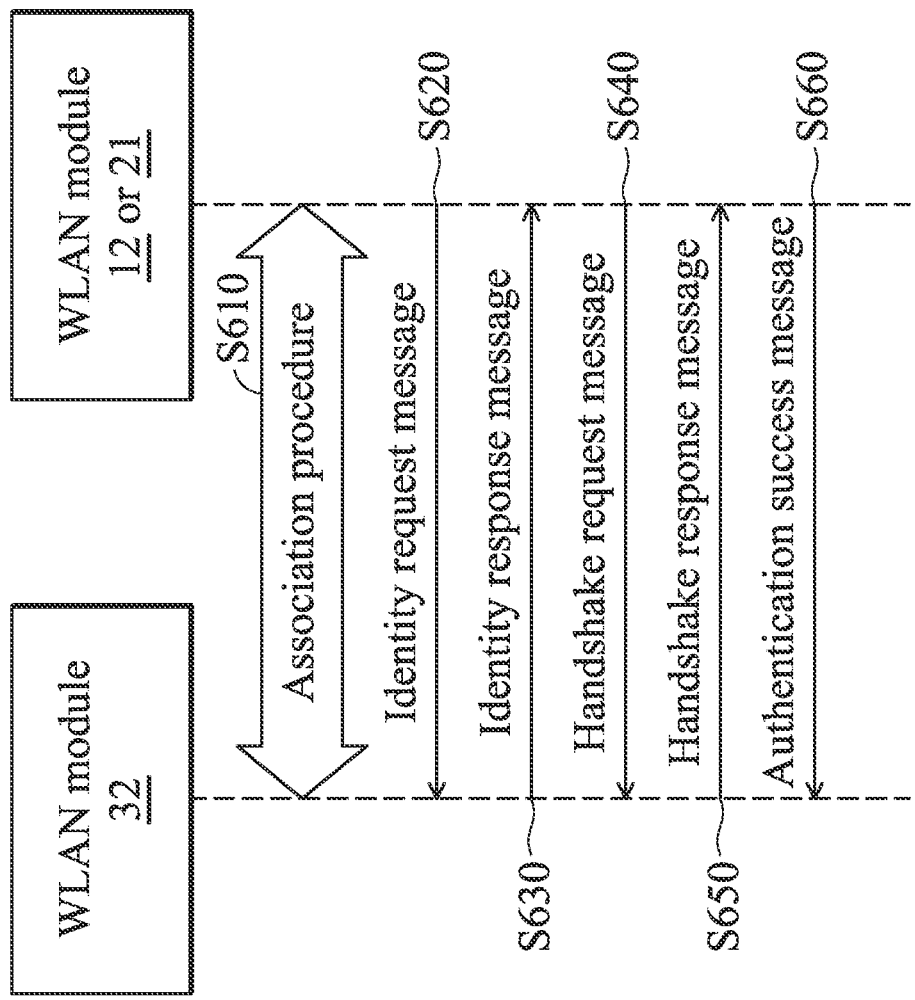
FIG. 6 is a message sequence chart illustrating the establishment of the WLAN connection according to an embodiment of the invention.

FIG. 6 is a message sequence chart illustrating the establishment of the WLAN connection according to an embodiment of the invention. To begin, the WLAN module 32 performs an association procedure with the WLAN module 12 or 21 according to the SSID in the received security parameters (step S610). The association procedure is performed for establishing a WLAN connection for communicating between two WLAN modules. After the association procedure has been successfully completed, an authentication procedure is initiated by the WLAN module 12 or 21 transmitting an identity request message to the WLAN module 32 (step S620). In reply, the WLAN module 32 transmits an identity response message comprising the identity of the mobile communication device 114 to the WLAN module 12 or 21 (step S630). In one embodiment, the identity of the mobile communication device 114 may be the combination of the cell phone number of the mobile communication device 114 and the Public Land Mobile Network Identification (PLMN ID) to which the mobile communication device 114 is subscribed.

When receiving the identity of the mobile communication device 114, the WLAN module 12 or 21 transmits a handshake request message to the WLAN module 32 (step S640). Specifically, the handshake request message includes the encryption ticket in the security parameters which have been transmitted by the femto-cell module 11 via the encryption connection previously. Next, the WLAN module 32 checks if the encryption ticket in the handshake request message is the same as the encryption ticket in the security parameters which have been received by the cellular network module 31 via the encryption connection previously, and if so, replies to the WLAN module 12 or 21 with a handshake response message comprising the encryption ticket (step S650).

When receiving the handshake response message, the WLAN module 12 or 21 checks if the encryption ticket in the handshake response message is the same as the encryption ticket in the security parameters which have been transmitted by the femto-cell module 11 via the encryption connection previously, and if so, transmits an authentication success message to the WLAN module 32 (step S660). After that, the authentication procedure ends when the WLAN module 32 receives the authentication success message.

In one embodiment, after step S660, the WLAN module 32 and the WLAN module 12 or 21 may start to apply the encryption algorithm and the encryption password for encrypting and decrypting subsequent Transmission and Reception (Tx/Rx) packets. In another embodiment, WLAN module 32 and the WLAN module 12 or 21 may start to apply the encryption algorithm and the encryption password for encrypting and decrypting subsequent Tx/Rx packets or messages, after step S610 and before step S620, so as to keep the confidentiality of the identity of the mobile communication device 114 and the encryption ticket.

In the embodiment of FIG. 6, if the WLAN module 32 and the WLAN module 12 or 21 use the WiFi technology for communications therebetween, the identity request message in step S620 may be an EAP_Request/Identity message, the identity response message in step S630 may be an EAP_Response/Identity message, the handshake request message in step S640 may be an EAP_Request/TICKET_Handshake message, the handshake response message in step S650 may be an EAP_Response/TICKET_Handshake message, and the authentication success message in step S660 may be an EAP_Success message. Specifically, the EAP_Request/Identity message, the EAP_Response/Identity message, and the EAP_Success message are in compliance with the Extensible Authentication Protocol (EAP) specified by the RFC3748 specification.

Taking the EAP as an example, in the conventional WLAN authentication procedure, a great deal of signaling between the transmitter and the receiver is necessary for data security and this will inevitably cause significant delays and affect user experience. To the contrary, in the present invention, the security parameters associated with the WLAN technology are transmitted using the cellular network technology, so that the required signaling for the authentication procedure of the WLAN technology is effectively decreased to solve the delay problems.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A Wireless Access Point (WAP), comprising:
   a Local Area Network (LAN) interface, configured to provide access to the Internet;
   a first wireless module, configured to generate a plurality of security parameters associated with a Wireless LAN (WLAN) technology, use the WLAN technology to perform an authentication procedure with a mobile communication device according to the security parameters, and after completing the authentication procedure, provide a Hotspot service of the WLAN technology to the mobile communication device via the LAN interface; and
   a second wireless module, configured to use a cellular network technology to establish an encrypted connection with the mobile communication device and transmit the security parameters to the mobile communication device via the encrypted connection.

2. The WAP of claim 1, wherein the security parameters comprise an encryption algorithm, an encryption password, and an encryption ticket.

3. The WAP of claim 2, wherein the authentication procedure comprises:
   transmitting a handshake request message comprising the encryption ticket to the mobile communication device;
   receiving a handshake response message from the mobile communication device;
   determining whether the handshake response message comprises the encryption ticket; and
   if so, transmitting an authentication success message to the mobile communication device.

4. The WAP of claim 2, wherein the first wireless module is further configured to encrypt and decrypt subsequent Transmission (Tx) packets and Reception (Rx) packets using the encryption algorithm and the encryption password, after completing the authentication procedure.

5. The WAP of claim 3, wherein the authentication procedure further comprises:
   transmitting an identity request message to the mobile communication device, prior to the transmission of the handshake request message; and
   receiving an identity response message from the mobile communication device, wherein the identity response message comprises an identity of the mobile communication device.

6. The WAP of claim 5, wherein the first wireless module is further configured to encrypt and decrypt subsequent Transmission (Tx) packets and Reception (Rx) packets using the encryption algorithm and the encryption password, before performing the authentication procedure, and wherein the Tx packets comprise the identity request message, the handshake request message, and the authentication success message, and the Rx packets comprise the identity response message and the handshake response message.

7. A Wireless Access Point (WAP), comprising:
   a Local Area Network (LAN) interface, configured to provide access to the Internet;
   a first wireless module, configured to generate a plurality of security parameters associated with a Wireless LAN (WLAN) technology, use the WLAN technology to perform an authentication procedure with a mobile communication device according to the security parameters, and after completing the authentication procedure, provide a Hotspot service of the WLAN technology to the mobile communication device via the LAN interface,
   wherein the security parameters are transmitted, prior to the authentication procedure, to the mobile communication device via an encrypted connection which is established using a cellular network technology;
   wherein the security parameters comprise an encryption algorithm, an encryption password, and an encryption ticket.

8. The WAP of claim 7, wherein the authentication procedure comprises:
   transmitting a handshake request message comprising the encryption ticket to the mobile communication device;
   receiving a handshake response message from the mobile communication device;
   determining whether the handshake response message comprises the encryption ticket; and
   if so, transmitting an authentication success message to the mobile communication device.

9. The WAP of claim 7, wherein the first wireless module is further configured to encrypt and decrypt subsequent Transmission (Tx) packets and Reception (Rx) packets using the encryption algorithm and the encryption password, after completing the authentication procedure.

10. The WAP of claim 8, wherein the authentication procedure further comprises:
    transmitting an identity request message to the mobile communication device, prior to the transmission of the handshake request message; and
    receiving an identity response message from the mobile communication device, wherein the identity response message comprises an identity of the mobile communication device.

11. The WAP of claim 10, wherein the first wireless module is further configured to encrypt and decrypt subsequent Transmission (Tx) packets and Reception (Rx) packets using the encryption algorithm and the encryption password, before performing the authentication procedure, and wherein the Tx packets comprise the identity request message, the handshake request message, and the authentication success message, and the Rx packets comprise the identity response message and the handshake response message.

* * * * *